(12) United States Patent
Satake et al.

(10) Patent No.: US 10,310,522 B2
(45) Date of Patent: Jun. 4, 2019

(54) CONTROL VALVE

(71) Applicant: TGK CO., LTD., Tokyo (JP)

(72) Inventors: Ryosuke Satake, Tokyo (JP); Takeshi Kaneko, Tokyo (JP)

(73) Assignee: TGK CO., LTD., Tokyo (JP)

( * ) Notice: Subject to any disclaimer, the term of this patent is extended or adjusted under 35 U.S.C. 154(b) by 54 days.

(21) Appl. No.: 15/238,055

(22) Filed: Aug. 16, 2016

(65) Prior Publication Data
US 2017/0052548 A1    Feb. 23, 2017

(30) Foreign Application Priority Data

Aug. 19, 2015 (JP) .................. 2015-162020

(51) Int. Cl.
*F16K 1/14* (2006.01)
*G05D 16/06* (2006.01)
(Continued)

(52) U.S. Cl.
CPC .......... *G05D 16/0633* (2013.01); *F16K 1/14* (2013.01); *F16K 31/126* (2013.01);
(Continued)

(58) Field of Classification Search
CPC ...... F16K 1/14; F16K 31/126; F16K 31/1262; F16K 31/1266; G05D 16/0633;
(Continued)

(56) References Cited

U.S. PATENT DOCUMENTS 769,050 A    8/1904  Boekel
807,813 A *  12/1905 Fiske ................. F16K 17/00
                                                    137/465
(Continued)

FOREIGN PATENT DOCUMENTS

JP    S57-198471 U1    12/1982
JP    S61-091471 A      5/1986
(Continued)

OTHER PUBLICATIONS

Japanese Patent Office, Office Action, dated Jan. 25, 2019, 4 pages, with English translation (8 pages).

*Primary Examiner* — Jessica Cahill
(74) *Attorney, Agent, or Firm* — Muncy, Geissler, Olds & Lowe, P.C.

(57) ABSTRACT

A control valve of an embodiment includes a disc coaxially in contact with a diaphragm, and a shaft configured to transmit a drive force in an axial direction caused by displacement of the diaphragm to a valve element. The diaphragm has a corrugated portion between a flat portion and the outer peripheral portion, the flat portion having a contact surface with which the disc is in contact. The corrugated portion includes substantially N+0.5 corrugations (N being a natural number) each protruding relative to a reference surface, the corrugations being formed between the outer peripheral portion and the flat portion, the reference surface being one surface of the outer peripheral portion. A height of each of the N corrugations of the corrugated portion is smaller than a height of the flat portion, the heights each being a height relative to the reference surface in an unloaded condition.

10 Claims, 5 Drawing Sheets

(51) Int. Cl.
*F16K 31/126* (2006.01)
*F25B 41/06* (2006.01)

(52) U.S. Cl.
CPC ........ *F16K 31/1266* (2013.01); *F25B 41/062* (2013.01); *F25B 2341/0683* (2013.01); *F25B 2700/191* (2013.01); *F25B 2700/1933* (2013.01); *F25B 2700/21151* (2013.01)

(58) Field of Classification Search
CPC ................ F25B 41/062; F25B 41/0683; F25B 2341/0683; F25B 2700/1933; F25B 2700/21151
USPC ....... 92/104; 251/61.2, 331, 335.2; 236/92 B
See application file for complete search history.

(56) References Cited

U.S. PATENT DOCUMENTS

| | | | | |
|---|---|---|---|---|
| 1,237,981 | A * | 8/1917 | Webster | F16K 39/022 251/281 |
| 2,472,149 | A * | 6/1949 | Dillman | F25B 41/062 236/92 B |
| 3,388,864 | A * | 6/1968 | Noakes | F25B 41/062 137/454.2 |
| 6,062,484 | A * | 5/2000 | Eybergen | F16K 31/002 236/92 B |
| 8,104,397 | B2 * | 1/2012 | Gelnett | G01F 15/16 92/103 F |
| 2002/0023966 | A1 * | 2/2002 | Minowa | F16K 31/002 236/92 B |
| 2004/0026523 | A1 * | 2/2004 | Kobayashi | F25B 41/062 236/92 B |
| 2004/0079811 | A1 * | 4/2004 | Matsuda | F16K 31/42 236/92 B |
| 2005/0120741 | A1 * | 6/2005 | Nanbu | F25B 41/062 62/527 |
| 2006/0196201 | A1 * | 9/2006 | Sendo | B22D 17/007 62/222 |
| 2007/0209387 | A1 * | 9/2007 | Hirota | F25B 41/062 62/527 |
| 2008/0185452 | A1 * | 8/2008 | Kobayashi | F25B 41/062 236/92 B |
| 2010/0320410 | A1 | 12/2010 | Mogi et al. | |

FOREIGN PATENT DOCUMENTS

| | | |
|---|---|---|
| JP | 2008-39262 A | 2/2008 |
| JP | 2011-7355 A | 1/2011 |
| JP | 2013-007531 A | 1/2013 |
| JP | 2013-242129 A | 12/2013 |
| JP | 2012-197990 A | 6/2015 |

* cited by examiner 0.5 CORRUGATION  1 CORRUGATION 0.5 CORRUGATION  1 CORRUGATION

CONTROL VALVE

CLAIM OF PRIORITY

This application claims priority to Japanese Patent Application No. 2015-162020, filed on Aug. 19, 2015, and is incorporated herein by reference.

BACKGROUND OF THE INVENTION

1. Field of the Invention

The present invention relates to a control valve, and more particularly to a control valve including a diaphragm serving as a pressure sensing member.

2. Description of the Related Art

Control valves having diaphragms as pressure sensing members, such as expansion valves installed in refrigeration cycles, have been widely used. For example, such an expansion valve is formed by an assembly of a body having a valve section formed therein and a power element. The power element is provided with a diaphragm that partitions the inside of a housing of the power element into a closed space and an open space. The closed space is filled with a gas for sensing pressure, and the open space communicates with the inside of the body. The diaphragm senses a pressure difference between the closed space and the open space, and is displaced thereby in an axial direction. A drive force caused by the pressure sensed by the diaphragm is transmitted to a valve element via a disc and a shaft, which regulates the opening degree of the valve section.

Miniaturization of such control valves may be required depending on equipment in which the control valves are installed. Despite the miniaturization, there may also be demands for a valve opening degree equivalent to those of conventional control valves so that a sufficient flow rate of a working fluid is ensured. There may also be demands for increasing the change in the valve opening degree (the change in the amount by which a valve element is lifted from a valve seat) with respect to the change in the pressure difference acting on a diaphragm regardless of the size of control valves.

In an attempt to address such demands, a technique of adjusting the corrugation pattern of a corrugated portion of a diaphragm and the height of the corrugation is proposed (refer, for example, to Japanese Patent Application Publication No. 2011-007355). Specifically, the corrugation pattern of a corrugated portion is adjusted so that the number of corrugations of the corrugation pattern has a fraction, such as one and a half corrugations. In addition, the height of corrugations above the circumference of the diaphragm is made equal to the height of the contact between the diaphragm and a disc. Such a structure increases the stroke of the diaphragm and thus increases the lift amount of the valve element as compared to conventional structures in which the number of corrugations has no fraction.

RELATED ART LIST (1) Japanese Patent Application Publication No. 2011-007355

Verification conducted by the inventors, however, has shown that the aforementioned proposed structure leaves room for improvement in terms of ensuring a sufficient valve opening degree and the durability of the diaphragm.

SUMMARY OF THE INVENTION

One purpose of the present invention is to ensure a large valve opening degree and increasing the durability of a diaphragm in a control valve including the diaphragm as a pressure sensing member.

One embodiment of the present invention relates to a control valve. The control valve includes: a body having an inlet port through which a fluid is introduced, an outlet port through which the fluid is delivered, a valve hole in a fluid passage connecting the inlet port and the outlet port, and a pressure chamber separated from the fluid passage by a partition; a valve element disposed in the fluid passage and configured to move toward and away from the valve hole to adjust an opening degree of a valve section; a power element including a housing forming the pressure chamber between the body and the housing, and a diaphragm having an outer peripheral portion supported by the housing and partitioning an inside of the housing into a closed space separated from the pressure chamber and an open space being open toward the pressure chamber; a disc disposed in the open space and coaxially in contact with the diaphragm; and a shaft extending through the partition and slidably supported in an axial direction thereof, having a first end connected with the diaphragm via the disc and a second end connected with the valve element, and being configured to transmit a drive force in the axial direction caused by displacement of the diaphragm to the valve element.

The diaphragm has a corrugated portion between a flat portion and the outer peripheral portion, the flat portion having a contact surface with which the disc is in contact, the corrugated portion having a concentric circular pattern in plan view and a corrugation pattern in cross-sectional view. The corrugated portion includes substantially N+0.5 corrugations (N being a natural number) each protruding toward a pressure chamber side relative to a reference surface, the reference surface being a surface on the pressure chamber side of the outer peripheral portion, the corrugations being formed between the outer peripheral portion and the flat portion. A height of each of the N corrugations of the corrugated portion between the outer peripheral portion and the flat portion is smaller than a height of the flat portion, the heights each being a height toward the pressure chamber side relative to the reference surface in an unloaded condition.

In this embodiment, the number of corrugations constituting the corrugated portion is set to have a fraction, and the height of each of the N corrugations between the outer peripheral portion and the flat portion of the diaphragm is set to be smaller than the height of the flat portion. As a result, a large stroke of the diaphragm is ensured, and the maximum stress acting on the diaphragm is suppressed. Consequently, a large lift amount of the valve element is ensured and the durability of the diaphragm is improved.

Another embodiment of the present invention relates to a method for manufacturing a control valve including: a body having a valve section therein; and a power element having a diaphragm as a pressure sensing member and being configured to generate a drive force of the valve section. The manufacturing method includes: forming the diaphragm; assembling the power element so that the diaphragm is supported in a manner displaceable in an axial direction by an outer peripheral portion serving as a support; and mounting the power element on the body.

Forming the diaphragm includes forming a corrugated portion between a flat portion around a center of the diaphragm and an outer peripheral portion, the corrugated portion having a concentric circular pattern in plan view and a corrugation pattern in cross-sectional view in an unloaded condition where the diaphragm is not subjected to a pressure difference in an axial direction. In forming the corrugated portion: substantially N+0.5 corrugations (N being a natural number) each protruding toward one side of the outer peripheral portion relative to a reference surface are formed from the outer peripheral portion toward the flat portion, the reference surface being one surface of the outer peripheral portion, and a height of each of the N corrugations of the corrugated portion between the outer peripheral portion and the flat portion is smaller than a height of the flat portion, the heights each being a height toward the one side relative to the reference surface.

In this embodiment, the diaphragm is formed so that the number of corrugations of the corrugated portion has a fraction, and that the height of each of the N corrugations between the outer peripheral portion and the flat portion of the diaphragm is smaller than the height of the flat portion. As a result, a control valve capable of ensuring a large valve opening degree and improving the durability of the diaphragm is provided.

DETAILED DESCRIPTION OF THE INVENTION

Figure 1:
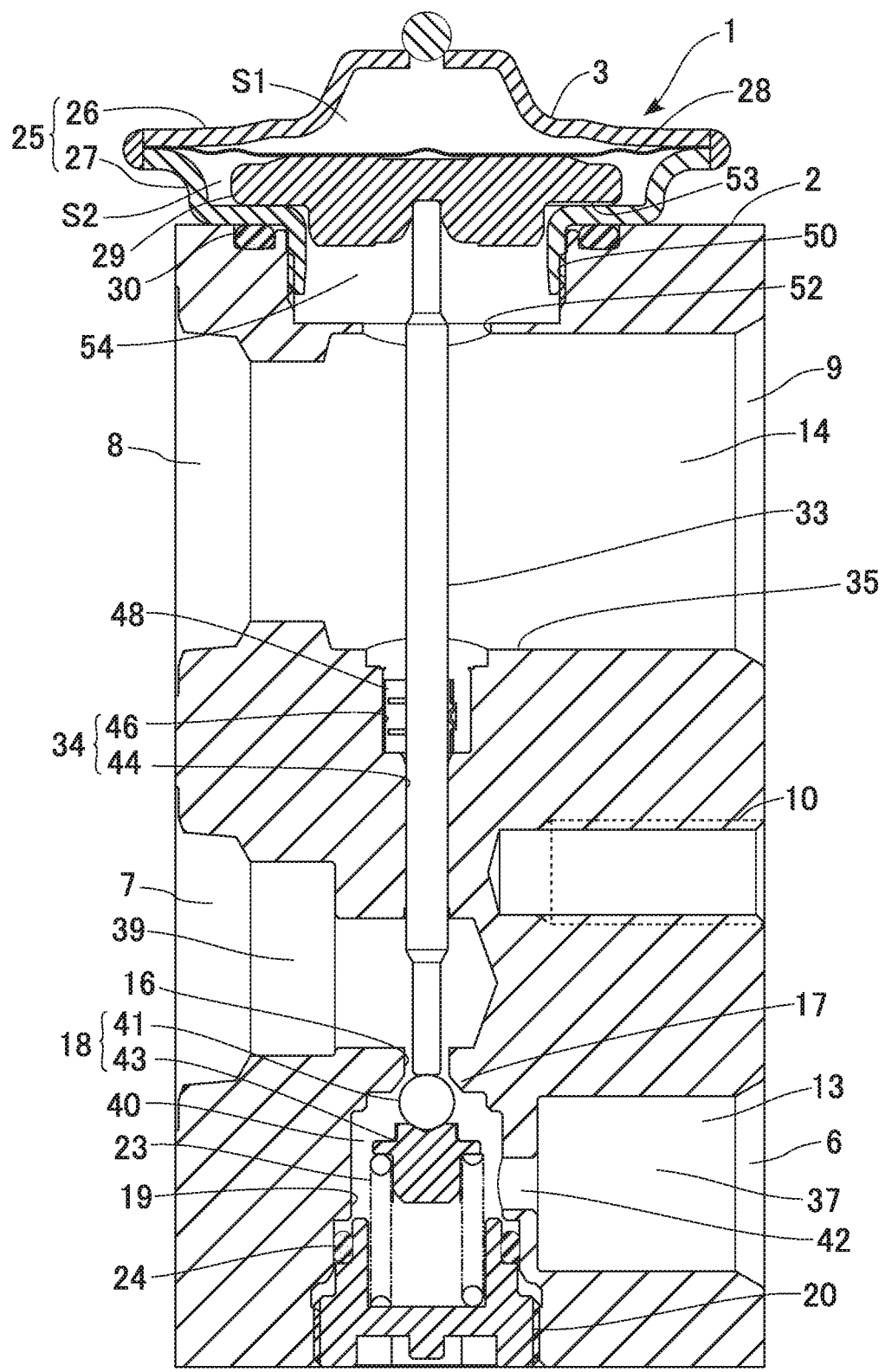
FIG. 1 is a cross sectional view of an expansion valve according to an embodiment.

The invention will now be described by reference to the preferred embodiments. This does not intend to limit the scope of the present invention, but to exemplify the invention.

An embodiment of the present invention will now be described in detail with reference to the accompanying drawings. In the following description, for convenience of description, the positional relationship in each structure may be expressed with reference to how the structure is depicted in the drawings. In the following embodiment and its modifications, components that are substantially the same will be designated by the same reference numerals and redundant description thereof will be omitted as appropriate.

The embodiment embodies an expansion valve of the present invention in a form of a thermostatic expansion valve applicable to a refrigeration cycle in an automotive air conditioner. The refrigeration cycle includes a compressor for compressing a circulating refrigerant, a condenser for condensing the compressed refrigerant, a receiver for separating the condensed refrigerant into gas and liquid, an expansion valve for throttling and expanding the separated liquid refrigerant and delivering the resulting spray of refrigerant, and an evaporator for evaporating the misty refrigerant to cool the air in a vehicle interior by evaporative latent heat. For convenience of description, detailed description of components other than the expansion valve will be omitted herein.

FIG. 1 is a cross-sectional view of the expansion valve according to the embodiment.

The expansion valve 1 has a body 2 formed by extrusion molding of a material made of an aluminum alloy and performing predetermined cutting on the member obtained by the extrusion molding. The body 2 has a prism shape, and has a valve section in the inside thereof for throttling and expanding the refrigerant. A power element 3, which functions as a "drive section", is disposed at an end in the longitudinal direction of the body 2.

The body 2 has, on sides thereof, an inlet port 6 through which a high-temperature and high-pressure liquid refrigerant is introduced from the receiver side (condenser side), an outlet port 7 through which the low-temperature and low-pressure refrigerant resulting from the throttling expansion through the expansion valve 1 is delivered toward the evaporator, an inlet port 8 through which the refrigerant evaporated by the evaporator is introduced, and an outlet port 9 through which the refrigerant having passed through the expansion valve 1 is delivered to the compressor side. A screw hole 10, into which a not-shown stud bolt for mounting a pipe can be screwed, is formed between the inlet port 6 and the outlet port 9. Each of the ports is connected with a pipe joint.

In the expansion valve 1, the inlet port 6, the outlet port 7, and a refrigerant passage (fluid passage) connecting these ports constitute a first passage 13. A valve section is formed in an intermediate portion of the first passage 13. The refrigerant introduced through the inlet port 6 is throttled and expanded into a spray through the valve section, and delivered toward the evaporator through the outlet port 7. In addition, the inlet port 8, the outlet port 9, and a refrigerant passage connecting these ports constitute a second passage 14. The second passage 14 extends straight and an intermediate portion thereof communicates with the inside of the power element 3. Part of the refrigerant introduced through the inlet port 8 is supplied to the power element 3 by which the temperature of the refrigerant is sensed. The refrigerant having passed through the second passage 14 is delivered toward the compressor through the outlet port 9.

A valve hole 16 is formed at the intermediate portion of the first passage 13, and a valve seat 17 is formed by an open end edge of the valve hole 16 on the side of the inlet port 6. A valve element 18 is disposed facing the valve seat 17 from the side of the inlet port 6. The valve element 18 has a spherical ball valve element 41 for opening and closing the valve section by leaving and touching the valve seat 17, and a valve element support 43 for supporting the ball valve element 41 from below, which are joined together.

A communication hole 19 connecting the inside and the outside of the body 2 is formed in a lower end part of the body 2. The upper half of the communication hole 19 forms a valve chamber 40, in which the valve element 18 is accommodated. The valve chamber 40 communicates with the valve hole 16, and is formed coaxially with the valve hole 16. The valve chamber 40 also communicates with the inlet port 6 at a lateral side thereof via an upstream-side passage 37. The upstream-side passage 37 includes a small hole 42 that is open toward the valve chamber 40. The small hole 42 is a portion of the first passage 13 where the cross-section thereof is locally made small.

The valve hole 16 communicates with the outlet port 7 via a downstream-side passage 39. Thus, the upstream-side passage 37, the valve chamber 40, the valve hole 16, and the downstream-side passage 39 constitute the first passage 13. The upstream-side passage 37 and the downstream-side passage 39 are parallel to each other and each extend in a direction perpendicular to the axis of the valve hole 16. In a modification, the inlet port 6 or the outlet port 7 may be positioned so that projections of the upstream-side passage 37 and the downstream-side passage 39 are perpendicular to each other (so that the upstream-side passage 37 and the downstream-side passage 39 are skew with respect to each other).

An adjusting screw 20 is screwed into a lower half of the communication hole 19 in such a manner as to seal the communication hole 19 from outside. A spring 23 for biasing the valve element 18 in a valve closing direction is disposed between the valve element 18 (more specifically, the valve element support 43) and the adjusting screw 20. The load of the spring 23 can be adjusted by adjustment of the insertion amount of the adjusting screw 20 into the body 2. An O-ring 24 for preventing leakage of the refrigerant is disposed between the adjusting screw 20 and the body 2.

A recess 50 is formed at an upper end of the body 2, and an opening 52 connecting the inside and the outside of the body 2 is formed at a bottom of the recess 50. The power element 3 has a lower part screwed into the recess 50 and is mounted on the body 2 in such a manner as to seal the opening 52. A space between the recess 50 and the power element 3 constitutes a temperature sensitive chamber 54 (functioning as a "pressure chamber").

The power element 3 includes a housing 25 provided in such a manner that the temperature sensitive chamber 54 is formed between the housing 25 and the body 2, and a diaphragm 28 partitioning the inside of the housing 25 along the axial direction. The housing 25 is an assembly of an upper housing 26 and a lower housing 27 connected along the axial direction. The diaphragm 28 functions as a "pressure sensing member."

Specifically, the power element 3 has the diaphragm 28 provided between the upper housing 26 and the lower housing 27 thereof, and a disc 29 disposed on the lower housing 27 side of the diaphragm 28. The upper housing 26 is formed by press-forming a stainless steel material into a lidded shape. The lower housing 27 is formed by press-forming a stainless steel material into a stepped cylindrical shape. The disc 29 is made of aluminum or an aluminum alloy, for example, and has a higher thermal conductivity than the upper and lower housings. In the present embodiment, the diaphragm 28 is made of a metal sheet such as a stainless steel sheet.

The power element 3 is formed in a shape of a container by making the upper housing 26 and the lower housing 27 in contact with each other at the openings thereof, mounting the diaphragm 28 so that an outer edge of the diaphragm 28 is placed between outer edges of the upper housing 26 and the lower housing 27, and welding along a circumferential joint of the upper and lower housing. The inside of the power element 3 is partitioned into a closed space S1 and an open space S2 by the diaphragm 28. The closed space S1 is separated from the temperature sensitive chamber 54, and a gas for sensing temperature is sealed in the closed space S1. The open space S2 is open toward the temperature sensitive chamber 54, and communicates with the second passage 14 via the opening 52. The disc 29 is disposed in the open space S2 and coaxially in contact with the diaphragm 28. The structure of the diaphragm 28 and the structure therearound will be described in detail below.

An O-ring 30 for preventing leakage of the refrigerant is disposed between the power element 3 and the body 2. Part of the refrigerant having passed through the second passage 14 is introduced into the temperature sensitive chamber 54 through the opening 52, passes through a groove 53 formed on the disc 29, and is delivered to a lower surface of the diaphragm 28. In this manner, the temperature and the pressure of the refrigerant are transmitted to the diaphragm 28. The temperature of the refrigerant is also transmitted to the diaphragm 28 by heat conduction of the disc 29 having a high thermal conductivity.

An insertion hole 34 is formed through a partition 35 between the first passage 13 and the second passage 14 at a middle part of the body 2. The insertion hole 34 is a stepped hole having a small-diameter part 44 and a large-diameter part 46. An elongated shaft 33 is slidably inserted in the small-diameter part 44. The shaft 33 is a rod made of metal (stainless steel, for example), and is disposed between the disc 29 and the valve element 18. This enables the drive force generated by displacement of the diaphragm 28 to be transmitted to the valve element 18 via the disc 29 and the shaft 33 to open or close the valve section. The disc 29 is stopped by the lower housing 27, which restricts downward displacement of the disc 29. This prevents the diaphragm 28 from being excessively displaced in the valve opening direction.

An upper half of the shaft 33 extends across the second passage 14, and a lower half thereof is slidably supported in the small-diameter part 44 of the insertion hole 34. The large-diameter part 46 (which functions as a "mounting hole") contains a vibration-proof spring 48 for applying biasing force in a direction perpendicular to the axial direction of the shaft 33, that is, a lateral load (sliding load) onto the shaft 33. The shaft 33 is subjected to the lateral load of the vibration-proof spring 48, which suppresses vibration of the shaft 33 and the valve element due to refrigerant pressure fluctuation. Since a structure disclosed in Japanese Unexamined Patent Application Publication No. 2013-242129 can be used for the vibration-proof spring 48, detailed description of a specific structure thereof will be omitted.

In the present embodiment, although no sealing member such as an O-ring is provided between the insertion hole 34 and the shaft 33, leakage of refrigerant from the first passage 13 to the second passage 14 is prevented or minimized since the clearance between the shaft 33 and the small-diameter part 44 is sufficiently small. Thus, a so-called clearance seal is achieved.

The expansion valve 1 having the structure as described above is generally manufactured as follows. First, the body 2, the power element 3, the shaft 33, the vibration-proof spring 48, the valve element 18, and the adjusting screw 20 are individually manufactured. The body is formed by providing a block-like base member by extrusion and cutting (drilling) the base member with a drill. In secondary fabrication using the drilling, a screw hole into which the power element 3 is screwed is formed in the recess 50, and a screw hole into which the adjusting screw 20 is screwed is formed in the communication hole 19.

In the manufacture of the power element 3, each of the upper housing 26 and the lower housing 27 are formed by press-forming as described above. In the meantime, a thin disc-shaped stainless steel sheet is pressed to form the diaphragm 28 having a corrugated portion, which will be described below. The disc 29 is then placed on the lower housing 27, and the upper housing 26 and the lower housing 27 are welded together with the diaphragm 28 therebetween. As a result, the power element 3 is assembled so that the diaphragm 28 is supported in a manner displaceable in the axial direction by an outer peripheral portion of the diaphragm 28 serving as a support.

The valve element 18, the adjusting screw 20, the vibration-proof spring 48, the shaft 33, and the power element 3 are then mounted on the body 2 in order, and the expansion valve 1 is obtained. Details of a structure and forming of the diaphragm 28 will be described below.

In the expansion valve 1 having the structure as described above, the power element 3 senses the pressure and the temperature of refrigerant having returned from the evaporator via the inlet port 8, and the diaphragm 28 displaces. Specifically, the diaphragm 28 is displaced in the axial direction by a pressure difference between the pressure in the closed space S1 and the pressure in the open space S2 varying with a change in the temperature of the refrigerant at an outlet of the evaporator. This displacement of the diaphragm 28 produces a drive force, which is transmitted to the valve element 18 via the disc 29 and the shaft 33 so as to open and close the valve section. In the meantime, a liquid refrigerant supplied from a receiver is introduced through the inlet port 6, throttled and expanded while passing through the valve section to be turned into a low-temperature and low-pressure spray of refrigerant. The refrigerant is delivered through the outlet port 7 toward the evaporator.

Next, a structure of the diaphragm 28 and advantageous effects thereof will be described in detail below.

Figure 2A:
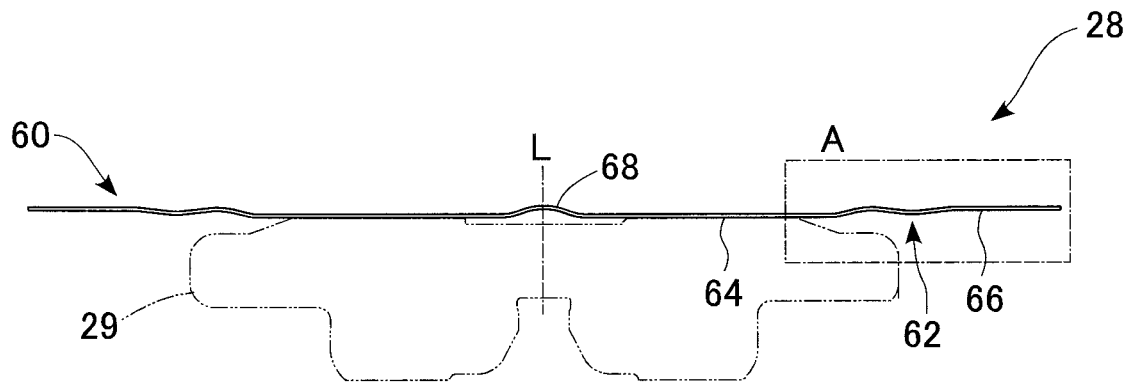
FIGS. 2A, 2B and 2C illustrate a structure of a diaphragm.
Figure 2B:
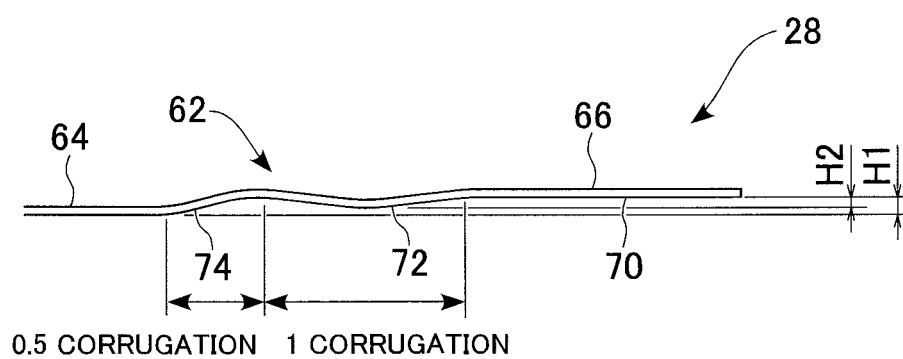

In this embodiment, the shape of the corrugated portion of the diaphragm 28 contributes to improvement in the valve opening performance and in the durability of the diaphragm 28. FIGS. 2A and 2B illustrate a structure of the diaphragm 28 alone. FIG. 2A is a cross-sectional view illustrates the diaphragm 28 alone before being mounted in the power element 3, that is, the diaphragm 28 in an unloaded condition. For convenience of explanation, the relative position of the disc 29 is shown by a long dashed double-short dashed line. FIG. 2B is a partially enlarged view of part A in FIG. 2A.

As illustrated in FIG. 2A, the diaphragm 28 has a thin disc-shaped main body 60. Although a plan view of the diaphragm 28 is omitted, the main body 60 has a corrugated portion 62 having a concentric circular pattern in plan view and a corrugation pattern in cross-sectional view (see a center line L). The main body 60 has a flat portion 64 around a central part thereof. The flat portion has a contact surface with which the disc 29 is in contact. The corrugated portion 62 is formed between the flat portion 64 and an outer peripheral portion 66 of the diaphragm 28. The flat portion 64 and the outer peripheral portion 66 are parallel to each other but are not on the same plane. The positions in the axial direction of the flat portion 64 and the outer peripheral portion 66 are slightly different from each other. The main body 60 has at the center thereof a swelling portion 68 protruding toward a side opposite to the disc 29. The swelling portion 68 is provided for easy recognition of the upper surface and the lower surface thereof in mounting the diaphragm 28 in the power element 3. In a modification, a diaphragm 28 without the swelling portion 68 may be used.

As also illustrated in FIG. 2B, the corrugated portion 62 includes corrugations each protruding downward relative to a reference surface 70, which is a lower surface (the surface on the side of the temperature sensitive chamber 54) of the outer peripheral portion 66, the corrugations being continuous in the radial direction of the diaphragm 28. In the illustrated example, corrugations 72 and 74 are formed from the outer peripheral portion 66 toward the flat portion 64. The corrugation 74 is a half-corrugation (0.5 corrugation). Thus, a corrugation pattern constituted by one and a half corrugations is formed. Alternatively, a corrugation pattern may be constituted by two and a half corrugations, for example. A corrugation pattern of substantially N+0.5 corrugations (N is a natural number) may be set (N=1 in the illustrated example). N may be set to a natural number of 3 or smaller, similarly to the configuration of Japanese Patent Application Publication No. 2011-007355.

With respect to the height in the downward direction relative to the reference surface 70 in the unloaded condition, the diaphragm 28 has a structure in which is the height H2 of the corrugation 72 of the corrugated portion 62 between the outer peripheral portion 66 and the flat portion 64 is smaller than the height H1 of the flat portion 64 (H2<H1). Since the corrugation 74 in the illustrated example has its peak at the flat portion 64, the corrugation 74 is not included in a concept of "a corrugation between the outer peripheral portion 66 and the flat portion 64." Thus, in the embodiment, since the corrugation pattern of the corrugated portion 62 is constituted by one and a half corrugations, the height H2 of one corrugation is smaller than the height H1 of the flat portion 64. When the corrugation pattern of the corrugated portion 62 is constituted by two and a half corrugations, the heights of the two corrugations are both smaller than the height H1 of the flat portion 64.

Figure 2C:
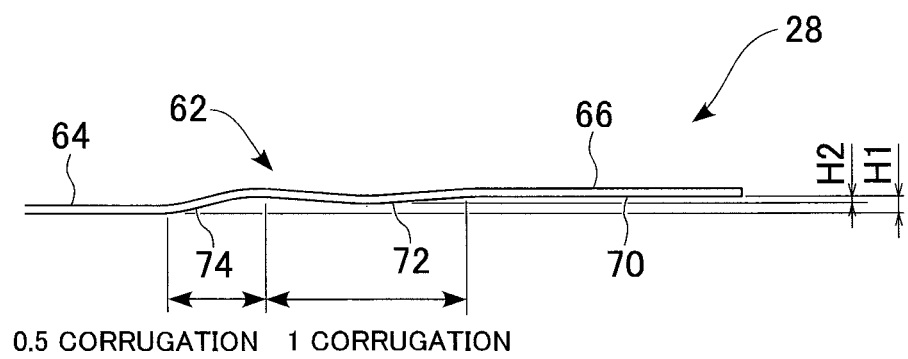

In FIG. 2B, H2 is less than H1, and is clearly more than half of H1, so that H2 is between 25% and 100% of H1. FIG. 2C shows a similar arrangement as FIG. 2B, but where H2 is 40% of H1, so that H2 is between 25% and 60% of H1.

In order to confirm the effects produced by the structure of the diaphragm 28 as described above, numerical analysis by CAE (Computer Aided Engineering) was conducted. This analysis evaluates the valve opening performance and the durability of the diaphragm 28 based on the shape of the corrugated portion 62. The "valve opening performance" is evaluated on the basis of a change in the lift amount by which the valve element 18 is lifted with respect to a change in the pressure difference between the pressure on the upper surface side and the pressure on the lower surface side of the diaphragm 28. As described above, a gas for sensing temperature is sealed in the closed space S1, and the pressure on the upper surface side of diaphragm 28 is the pressure of the gas. Herein, the pressure on the upper surface side is set so that, when the pressure on the lower surface side of the diaphragm 28 is an atmospheric pressure, the load on the valve opening direction caused by the pressure on the upper surface side is greater than the load in the valve closing direction caused by the spring 23, and the disc 29 is stopped by the lower housing 27. As the change in the lift amount is larger with respect to the change in the pressure difference resulting from an increase in the pressure on the lower surface side, the diaphragm 28 is evaluated to be better in the valve opening characteristics. The analysis result will be explained below.

Figure 3:
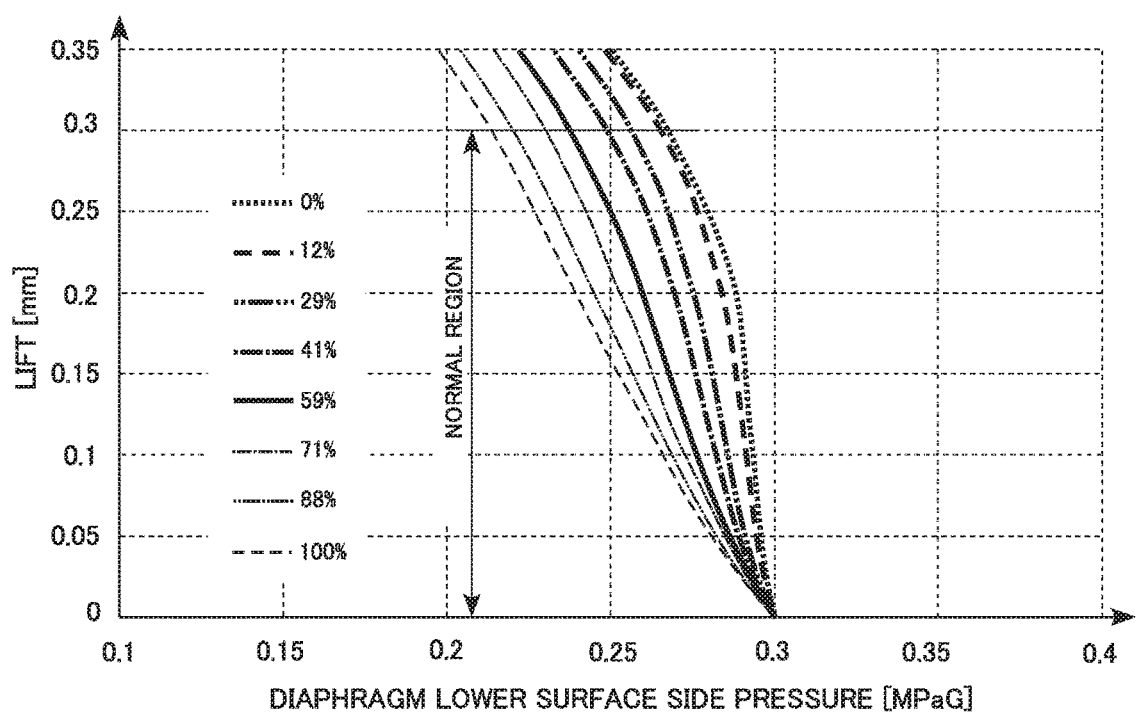
FIG. 3 is a graph showing a result of analysis of valve opening characteristics.

FIG. 3 is a graph showing a result of analysis of the valve opening performance. This analysis was conducted by computing a change in the lift amount of the valve element with respect to the change in the pressure difference acting on the diaphragm by finite element analysis. In FIG. 3, the horizontal axis represents the pressure (MPaG) on the lower surface side of the diaphragm 28 as gauge pressure, and the vertical axis represents the lift amount (mm) by which the valve element 18 is lifted from the valve seat 17. In this analysis, the pressure on the upper surface side was kept constant, and the lift amount (mm) when the pressure on the lower surface side was changed between 0 and 0.4 (MPaG) was computed. Such computation was conducted for a plurality of values set for the height of the corrugation between the outer peripheral portion and the flat portion of the diaphragm 28. Specifically, with the structure of the diaphragm 28 illustrated in FIG. 2B, the computation was conducted for different ratios (height ratios) of the height H2 of the corrugation 72 to the height H1 of the flat portion 64 relative to the reference surface 70.

FIG. 3 shows a result of analysis of eight diaphragms with different height ratios. In FIG. 3, the thick dotted line represents a result for a height ratio of 0%, the thick broken line represents a result for a height ratio of 12%, the thick long dashed double-short dashed line represents a result for a height ratio of 29%, the thick long dashed short dashed line represents a result for a height ratio of 41%, and the thick solid line represents a result for a height ratio of 59%. Furthermore, in FIG. 3, the thin long dashed short dashed line represents a result for a height ratio of 71%, the thin long dashed double-short dashed line represents a result for a height ratio of 88%, and the thin broken line represents a result for a height ratio of 100%. Note that a height ratio of 0% corresponds to a case in which only a half corrugation (0.5 corrugation) is formed as the corrugated portion 62. A height ratio of 100% represents a case in which the height H2 of the corrugation 72 is equal to the height H1 of the flat portion (H2=H1), which corresponds to the structure of Japanese Patent Application Publication No. 2011-007355.

Since a normal valve opening degree control region (also referred to as a "normal region") is between 0 and 0.3 (mm) in the lift amount, the tendency within this range was evaluated as the valve opening characteristics. According to the analysis result, it can be seen that the change in the lift amount of the valve element 18 with respect to the change in the pressure difference acting on the diaphragm 28 can be made larger as the height ratio is smaller. Thus, it can be seen that the valve opening characteristics can be improved by setting the height H2 of the corrugation 72 smaller than the height H1 of the flat portion 64. In particular, it can be seen that the valve opening characteristics significantly improve in a region (low temperature region) where the pressure on the lower surface side of the diaphragm 28 is high, that is, the pressure difference between the pressure on the upper surface side and the pressure on the lower surface side is small.

Figure 4A:
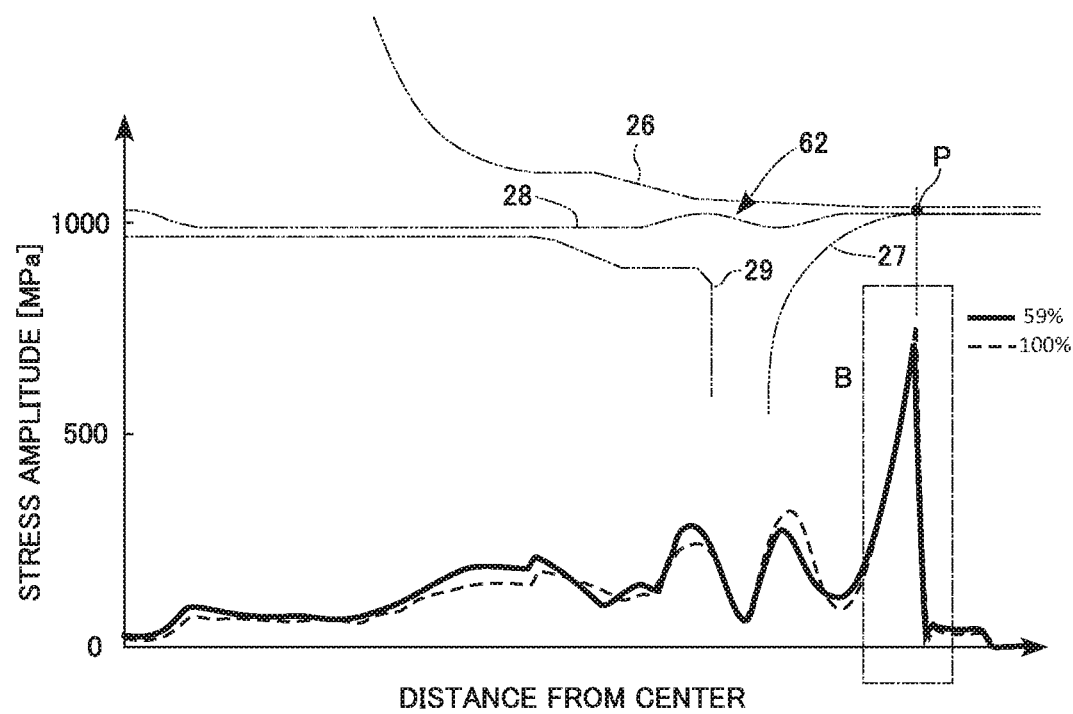
FIGS. 4A and 4B are graphs showing analytical results for evaluating the durability of the diaphragm.
Figure 4B:
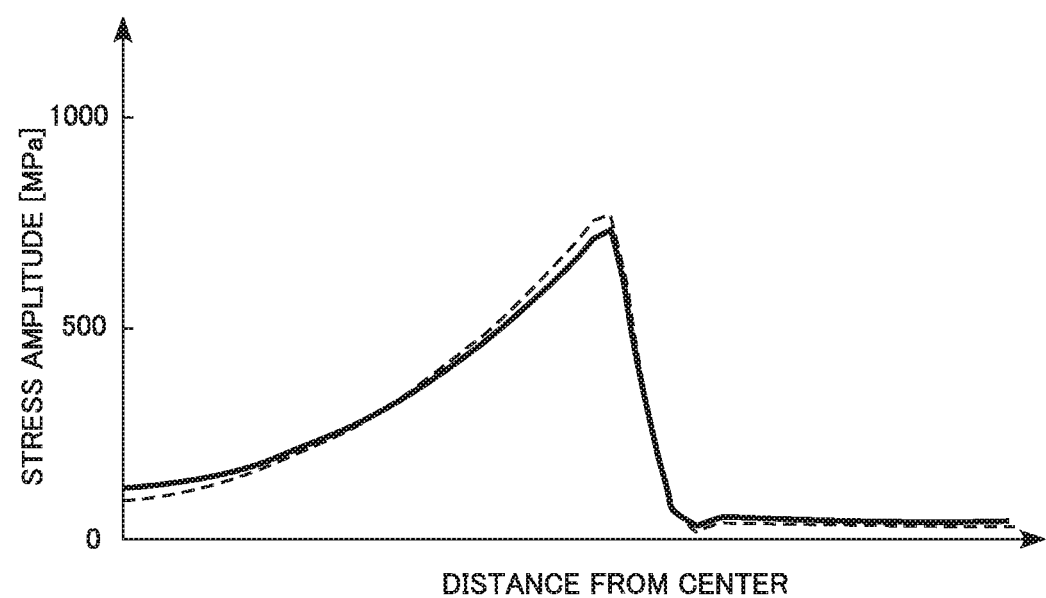

FIGS. 4A and 4B are graphs showing a result of analysis for evaluation of the durability of the diaphragm. This analysis was conducted by computing a stress generated at the surface of the diaphragm when cyclic loading is applied to the diaphragm by finite element analysis. Specifically, the pressure on the upper surface side of the diaphragm was kept constant, a varying load caused by repeatedly changing the pressure on the lower surface side within a range between 0 and 0.4 (MPaG) was applied, and the stress at the surface of the diaphragm was computed. Note that it is assumed that the diaphragm 28 does not come in contact with the upper housing 26 at a position inside of the support even when the pressure on the lower surface side is a maximum of 0.4 (MPaG) (see support P in FIG. 4A).

FIG. 4A shows a distribution of the stress acting on the diaphragm when cyclic loading is applied. In FIG. 4A, the horizontal axis represents the distance from the center of the diaphragm 28, and the vertical axis represents stress amplitude (MPa). For convenience of explanation, the positional relation of the diaphragm and the structure therearound is shown to correspond to the distance from the center in an upper part of FIG. 4A (see the long dashed double-short dashed line). FIG. 4B is an enlarged view of part B showing a region around a position where the stress amplitude is its maximum in FIG. 4A. In FIG. 4B, for convenience, a result for a height ratio of 100% is represented by a thin broken line, and a result for a height of 59% is represented by a thick solid line.

As shown in FIG. 4A, with both of the height ratios, the maximum stress is generated around the support P of the diaphragm 28 held between the upper housing 26 and the lower housing 27. With the height ratios, tendencies having similar distributions of stress with respect to the distance from the center are shown. As shown in FIG. 4B, however, in a region around the support P, the stress amplitude is more suppressed in the case with a height ratio of 59% than in the case with a height ratio of 100%. In contrast, the stress amplitude is more suppressed in the case with the height ratio of 100% than in the case with the height ratio of 59% at some positions other than around the support P. In view of this, it is presumed that reduction in the height ratio causes locally high stress to be distributed in the radial direction and the maximum stress is lowered. Note that the cases of the other height ratios will be described in relation to FIG. 5.

Figure 5:
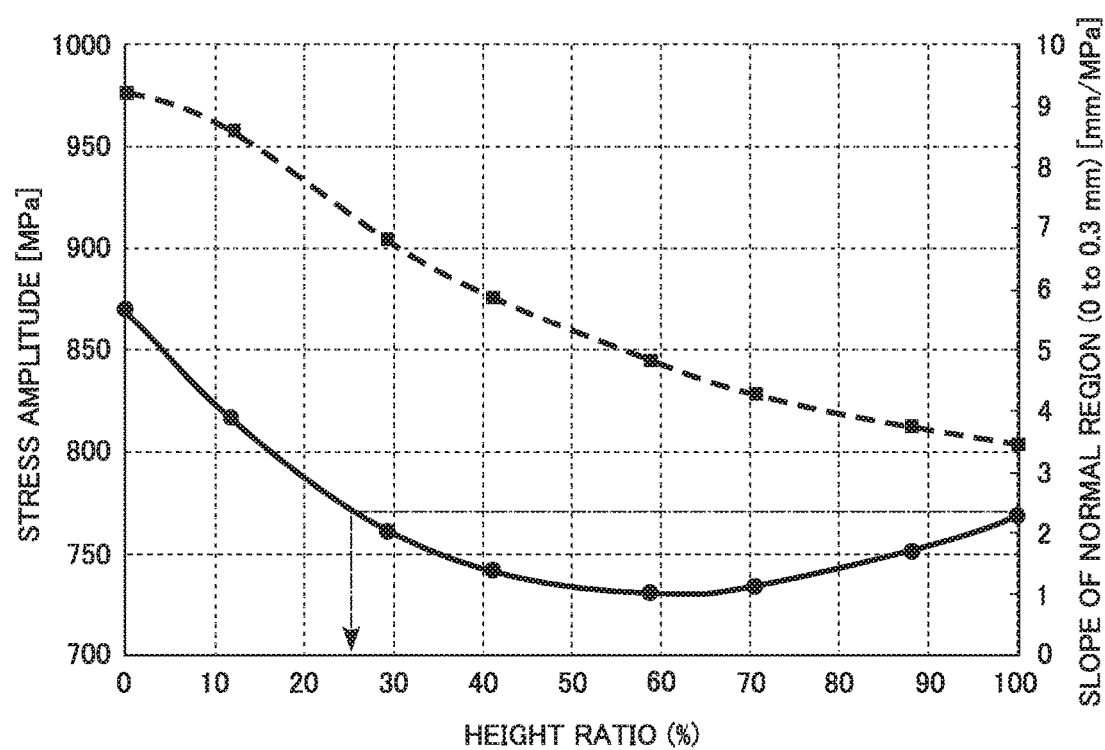
FIG. 5 is a graph showing the relation between a height ratio of a corrugation of a corrugated portion and the durability and the valve opening characteristics of the diaphragm.

FIG. 5 is a graph showing the relation between the height ratio of a corrugation of the corrugated portion and the durability and the valve opening characteristics of the diaphragm. In FIG. 5, the horizontal axis represents the height ratio (%). In FIG. 5, the solid line represents the stress amplitude (MPa) of the maximum stress, a broken line represents the valve opening characteristics in the normal region. The former is obtained by plotting the stress amplitude in the region around the support P shown in FIG. 4A for the respective height ratios shown in FIG. 3. The latter is obtained by plotting the change in the lift amount with respect to the change in the pressure on the lower surface side in the normal region shown in FIG. 3 as the valve opening characteristics. Herein, for simplicity, an average change amount expressed by a slope of a straight line connecting end points of the normal region for each of the height ratios is shown as the valve opening characteristics.

According to FIG. 5, it can be seen that better valve opening characteristics are obtained as the height ratio is smaller. In addition, it can be seen that the stress amplitude of the maximum stress is most suppressed at around the height ratio of 60%. In view of these, when focus is placed particularly on the valve opening characteristics, it can be seen that the height H2 of the corrugation 72 of the corrugated portion 62 is preferably smaller than the height H1 of the flat portion 64 as much as possible (H2<H1). In contrast, when focus is placed particularly on the durability of the diaphragm 28, it can be seen that the height ratio is preferably equal to or larger than 25% but smaller than 100%. Furthermore, it can be seen that, with a height ratio equal to or larger than 25% but equal to or smaller than 60%, the diaphragm 28 maintains high durability and has good valve opening characteristics.

As described above, according to the embodiment, the number of corrugations constituting the corrugated portion 62 is set to have a fraction, and in addition, the height of a corrugation between the outer peripheral portion 66 and the flat portion 64 of the diaphragm is set to be smaller than the height of the flat portion 64. As a result, a large stroke of the diaphragm 28 is ensured, and the maximum stress acting on the diaphragm 28 is suppressed. Consequently, a large lift amount of the valve element 18 is ensured and the durability of the diaphragm 28 is improved.

The description of the present invention given above is based upon an illustrative embodiment. The embodiment is intended to be illustrative only and it will be obvious to those skilled in the art that various modifications could be further developed within the technical idea underlying the present invention.

Although the expansion valve of the embodiment described above is suitably applicable to a refrigeration cycle using an alternative for chlorofluorocarbon (HFC-134a) or the like as the refrigerant, the expansion valve of the embodiment can also be applied to a refrigeration cycle using a refrigerant such as carbon dioxide with high working pressure. In this case, an external heat exchanger such as a gas cooler is provided instead of the condenser in the refrigeration cycle.

In the embodiment described above, an example in which the expansion valve is a valve for throttling and expanding a refrigerant having flowed therein via an external heat exchanger and supplying the resulting refrigerant to an evaporator (internal evaporator) has been presented. In a modification, the expansion valve may be applied to a heat pump automotive air conditioner and disposed downstream of an internal heat exchanger. Specifically, the expansion valve may be a valve for throttling and expanding a refrigerant having flowed therein via an internal heat exchanger and supplying the resulting refrigerant to an external heat exchanger (external evaporator).

Although an aspect of the expansion valve has been presented as an example in the embodiment described above, the expansion valve may have the features of such an expansion valve as presented in FIG. 1 of Japanese Patent Application Publication No. 2011-007355, that is, an expansion valve in which one end of a capillary tube is connected with a closed space of a power element. The other end of the capillary tube is connected with a feeler bulb that senses the temperature of a refrigerant at an outlet of an evaporator.

Although the expansion valve has been present as an example of a control valve in the embodiment described above, the diaphragm having the above-described structure is applicable to any control valve having a diaphragm as a pressure sensing member. In this case, the control valve may be used for a working fluid other than a refrigerant.

The present invention is not limited to the above-described embodiment and modifications only, and the components may be further modified to arrive at various other embodiments without departing from the scope of the invention. Various other embodiments may be further achieved by combining, as appropriate, a plurality of structural components disclosed in the above-described embodiment and modifications. Furthermore, one or some of all of the components exemplified in the above-described embodiment and modifications may be left unused or removed.

What is claimed is:

1. A control valve comprising:
a body having an inlet port through which a fluid is introduced, an outlet port through which the fluid is delivered, a valve hole in a fluid passage connecting the inlet port and the outlet port, and a pressure chamber separated from the fluid passage by a partition;
a valve element disposed in the fluid passage and configured to move toward and away from the valve hole to adjust an opening degree of a valve section;
a power element including a housing forming the pressure chamber between the body and the housing, and a diaphragm having an outer peripheral portion supported by the housing and partitioning an inside of the housing into a closed space separated from the pressure chamber and an open space being open toward the pressure chamber;
a disc disposed in the open space and coaxially in contact with the diaphragm; and
a shaft extending through the partition and slidably supported in an axial direction thereof, having a first end connected with the diaphragm via the disc and a second end connected with the valve element, and being configured to transmit a drive force in the axial direction caused by displacement of the diaphragm to the valve element,
wherein the diaphragm has a corrugated portion between a flat portion and the outer peripheral portion, the flat portion having a contact surface with which the disc is in contact, the corrugated portion having a concentric circular pattern in plan view and a corrugation pattern in cross-sectional view,
the corrugated portion includes substantially N+0.5 corrugations (N being a natural number no greater than three) each protruding toward a pressure chamber side relative to a reference surface, the reference surface being a surface on the pressure chamber side of the outer peripheral portion, the corrugations being formed between the outer peripheral portion and the flat portion, and
when the diaphragm is alone before being mounted in the power element, a height of each of the corrugations of the corrugated portion between the outer peripheral portion and the flat portion is smaller than a height of the flat portion, the heights each being a height toward the pressure chamber side relative to the reference surface.

2. The control valve according to claim 1, wherein the height of each of the corrugations between the outer peripheral portion and the flat portion is equal to or larger than 25% but smaller than 100% of the height of the flat portion.

3. The control valve according to claim 2, wherein the height of each of the corrugations between the outer peripheral portion and the flat portion is equal to or larger than 25% but equal to or smaller than 60% of the height of the flat portion.

4. The control valve according to claim 3, being provided in a refrigeration cycle device and functioning as an expansion valve for throttling and expanding a refrigerant flowing into the expansion valve via a heat exchanger, allowing the refrigerant to pass through the valve section, and supplying the refrigerant to an evaporator.

5. The control valve according to claim 4,
wherein the body includes the inlet port through which the refrigerant from the heat exchanger is introduced, the outlet port through which the refrigerant is delivered to the evaporator, the fluid passage connecting the inlet port and the outlet port, a second inlet port through which the refrigerant returning from the evaporator is introduced, a second outlet port through which the refrigerant is delivered toward a compressor, and a second passage including the pressure chamber between the second inlet port and the second outlet port,
wherein the partition separates the fluid passage from the second passage,
wherein the power element is provided on a side of the body opposite to the fluid passage with respect to the second passage, and operates by sensing temperature and pressure of the refrigerant flowing through the second passage, and
wherein the shaft extends through an insertion hole formed in the partition.

6. The control valve according to claim 2, being provided in a refrigeration cycle device and functioning as an expansion valve for throttling and expanding a refrigerant flowing into the expansion valve via a heat exchanger, allowing the refrigerant to pass through the valve section, and supplying the refrigerant to an evaporator.

7. The control valve according to claim 6,
wherein the body includes the inlet port through which the refrigerant from the heat exchanger is introduced, the outlet port through which the refrigerant is delivered to the evaporator, the fluid passage connecting the inlet port and the outlet port, a second inlet port through which the refrigerant returning from the evaporator is introduced, a second outlet port through which the refrigerant is delivered toward a compressor, and a second passage including the pressure chamber between the second inlet port and the second outlet port,
wherein the partition separates the fluid passage from the second passage,
wherein the power element is provided on a side of the body opposite to the fluid passage with respect to the second passage, and operates by sensing temperature and pressure of the refrigerant flowing through the second passage, and
wherein the shaft extends through an insertion hole formed in the partition.

8. The control valve according to claim 1, being provided in a refrigeration cycle device and functioning as an expansion valve for throttling and expanding a refrigerant flowing into the expansion valve via a heat exchanger, allowing the refrigerant to pass through the valve section, and supplying the refrigerant to an evaporator.

9. The control valve according to claim 8,
wherein the body includes the inlet port through which the refrigerant from the heat exchanger is introduced, the outlet port through which the refrigerant is delivered to the evaporator, the fluid passage connecting the inlet port and the outlet port, a second inlet port through which the refrigerant returning from the evaporator is introduced, a second outlet port through which the refrigerant is delivered toward a compressor, and a second passage including the pressure chamber between the second inlet port and the second outlet port,
wherein the partition separates the fluid passage from the second passage,
wherein the power element is provided on a side of the body opposite to the fluid passage with respect to the second passage, and operates by sensing temperature and pressure of the refrigerant flowing through the second passage, and
wherein the shaft extends through an insertion hole formed in the partition.

10. A method for manufacturing a control valve including: a body having a valve section therein; and a power element having a diaphragm as a pressure sensing member and being configured to generate a drive force of the valve section, the method comprising:
forming the diaphragm;
assembling the power element so that the diaphragm is supported in a manner displaceable in an axial direction by an outer peripheral portion serving as a support; and
mounting the power element on the body,
wherein forming the diaphragm includes forming a corrugated portion between a flat portion around a center of the diaphragm and the outer peripheral portion, the corrugated portion having a concentric circular pattern in plan view and a corrugation pattern in cross-sectional view in an unloaded condition where the diaphragm is not subjected to a pressure difference in an axial direction,
wherein in forming the corrugated portion when the diaphragm is alone before being mounted in the power element:
substantially N+0.5 corrugations (N being a natural number no greater than three) each protruding toward one side of the outer peripheral portion relative to a reference surface are formed from the outer peripheral portion toward the flat portion, the reference surface being one surface of the outer peripheral portion, and
a height of each of the corrugations of the corrugated portion between the outer peripheral portion and the flat portion is smaller than a height of the flat portion, the heights each being a height toward the one side relative to the reference surface.

* * * * *